United States Patent
Sun

(10) Patent No.: US 7,868,965 B2
(45) Date of Patent: Jan. 11, 2011

(54) LIQUID CRYSTAL DISPLAY DEVICE WITH BEZEL HAVING BEAD PORTION

(75) Inventor: He-Xin Sun, Shenzhen (CN)

(73) Assignees: Innocom Technology (ShenZhen) Co., Ltd., Shenzhen, Guangdong Province (CN); Chimel Innolux Corporation, Miao-Li County (TW)

( * ) Notice: Subject to any disclaimer, the term of this patent is extended or adjusted under 35 U.S.C. 154(b) by 629 days.

(21) Appl. No.: 11/985,258

(22) Filed: Nov. 13, 2007

(65) Prior Publication Data

US 2008/0111941 A1    May 15, 2008

(30) Foreign Application Priority Data

Nov. 10, 2006   (TW) .............................. 95141777 A

(51) Int. Cl.
*G02F 1/1333* (2006.01)
(52) U.S. Cl. .............................. 349/58; 349/59; 349/60; 345/7
(58) Field of Classification Search ............. 349/58–60; 345/7
See application file for complete search history.

(56) References Cited

U.S. PATENT DOCUMENTS

| | | | |
|---|---|---|---|
| 6,812,976 B2 * | 11/2004 | Satonaka | 349/58 |
| 6,888,591 B2 | 5/2005 | Kim | |
| 7,015,987 B2 | 3/2006 | Wu et al. | |
| 7,050,128 B2 | 5/2006 | Lee et al. | |
| 2005/0151899 A1 * | 7/2005 | Chou et al. | 349/110 |
| 2010/0007813 A1 * | 1/2010 | Lee et al. | 349/58 |

FOREIGN PATENT DOCUMENTS

| | | |
|---|---|---|
| CN | 1467544 A | 1/2004 |
| JP | 11-38431 A | 2/1999 |
| JP | 2002-55629 A | 2/2002 |

* cited by examiner

*Primary Examiner*—Julie-Huyen L Ngo
(74) *Attorney, Agent, or Firm*—Wei Te Chung

(57) ABSTRACT

An exemplary LCD device (2) includes a liquid crystal display panel (21) and a housing assembly (23). The LCD panel includes a first substrate (211), a second substrate (213) parallel to the first substrate, and a polarizer (215) attached on the first substrate. The housing assembly is arranged for holding the liquid crystal display. The housing assembly includes a bezel (231). The bezel includes at least one bead portion (25) adjacent to an inner free edge thereof. The at least one bead portion elastically contacts a peripheral edge area of the first substrate, and the inner free edge of the bezel covers a peripheral edge portion of the polarizer.

16 Claims, 5 Drawing Sheets

LIQUID CRYSTAL DISPLAY DEVICE WITH BEZEL HAVING BEAD PORTION

CROSS-REFERENCE TO RELATED APPLICATION

This application is related to, and claims the benefit of, a foreign priority application filed in Taiwan as Serial No. 095141777 on Nov. 10, 2006. The related application is incorporated herein by reference.

FIELD OF THE INVENTION

The present invention relates to liquid crystal display (LCD) devices, and particularly to an LCD device with a bezel having one or more bead portions.

BACKGROUND

A typical liquid crystal display (LCD) device is capable of displaying a clear and sharp image through thousands or even millions of pixels that make up the complete image. The LCD device has thus been applied to various electronic equipment in which messages or pictures need to be displayed, such as mobile phones and notebook computers. However, liquid crystal in the LCD device does not emit light itself. Rather, the liquid crystal has to be lit up by a light source so as to clearly and sharply display text and images. The light source may be ambient light, or a backlight module attached to the LCD device.

FIG. 8 is a schematic, top plan view of a typical LCD device. The LCD device 1 includes an LCD panel 11 and a housing assembly 13.

Referring also to FIG. 9, this is a cross-sectional view taken along line IX-IX of FIG. 8. The LCD panel 11 includes a first substrate 111, a second substrate 113 parallel to the first substrate 111, and a polarizer 115 attached on a major portion of a top surface of the first substrate 111. A margin portion of the top surface of the first substrate 111 is not covered by the polarizer 115. A plurality of driver integrated circuits (ICs) 1130 is mounted on a margin portion of a top surface of the second substrate 113. The housing assembly 13 includes a bezel 131 and a rear frame 133 for cooperatively containing and protecting the LCD panel 11. The rear frame 133 defines a space for housing the LCD panel 11 and a backlight module (not labeled) under the LCD panel 11. The bezel 131 includes four top walls 1313 arranged end to end, and four sidewalls 1311 perpendicularly extending from edges of the four top walls 1313, respectively. The four top walls 1313 press on the margin portion of the top surface of the first substrate 111 of the LCD panel 11 and a top of the rear frame 133. The four sidewalls 1311 enclose sidewalls of the rear frame 133. Thus, the LCD panel 11 is fixed in the housing assembly 13.

Typically, a small horizontal gap L1 exists between each top wall 1313 of the bezel 131 and the polarizer 115, in order to prevent the polarizer 115 from being distorted or damaged. However, if the gap L1 is too large, light beams from the backlight module leak out from the gap. This is liable to result in bright lines or other optical defects. On the other hand, if the gap L1 is eliminated and the top walls 1313 directly contact the polarizer 115, the bezel 131 is liable to distort or damage the polarizer 115. This is liable to cause mottling or other optical defects.

Accordingly, what is needed is an LCD device that can overcome the above-described deficiencies.

SUMMARY

In one aspect, an LCD device includes a liquid crystal display panel and a housing assembly. The LCD panel includes a first substrate, a second substrate parallel to the first substrate, and a polarizer attached on the first substrate. The housing assembly is arranged for holding the liquid crystal display. The housing assembly includes a bezel. The bezel includes at least one bead portion adjacent to an inner free edge thereof. The at least one bead portion elastically contacts a peripheral edge area of the first substrate, and the inner free edge of the bezel covers a peripheral edge portion of the polarizer.

In another aspect, an LCD device includes an LCD panel and a bezel configured for fixing the LCD panel therein. The bezel includes an elongate bead portion protruding toward and resiliently pressing on a peripheral edge area of the LCD panel.

In still another aspect, an LCD device includes an LCD panel, a polarizer attached on the LCD panel, and a bezel elastically pressing on a peripheral edge area of the LCD panel and fixing the LCD panel in position. The bezel includes an elongate supporting structure adjacent to an end of the bezel. The supporting structure is arranged between the bezel and the peripheral edge area of the LCD panel to maintain a gap therebetween. A peripheral portion of the polarizer extends into the gap.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe embodiments of the present invention in detail.

Figure 1:
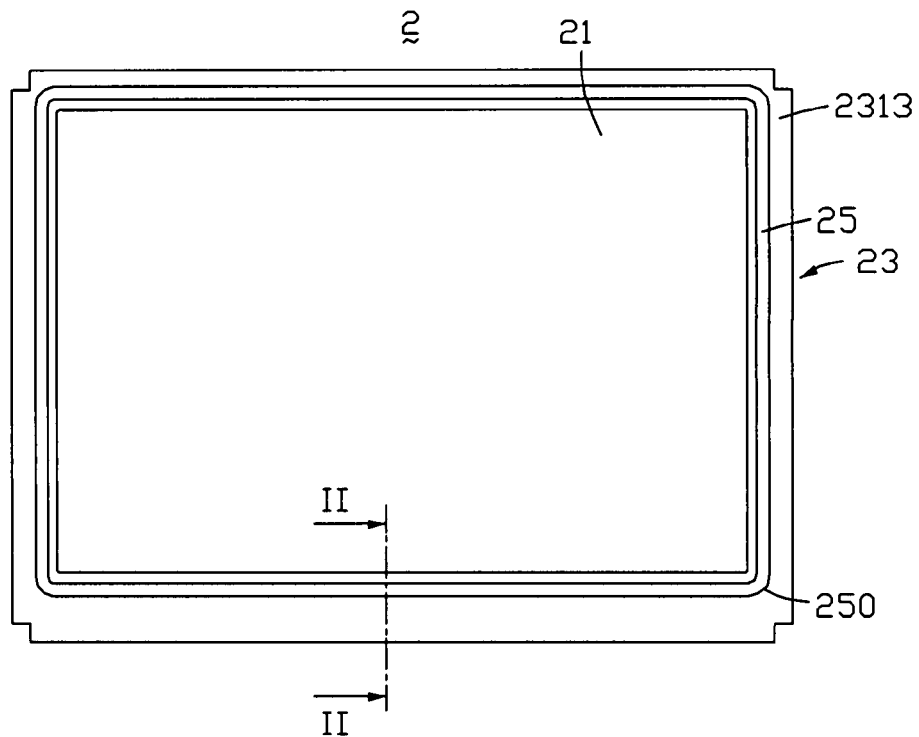
FIG. 1 is a top plan view of an LCD device according to a first embodiment of the present invention, the LCD device including an LCD panel and a housing assembly for holding the LCD panel.

Referring to FIG. 1, this is a schematic, top plan view of an LCD device 2 according to a first embodiment of the present invention. The LCD device 2 includes an LCD panel 21, and a housing assembly 23 for holding the LCD panel 21.

Figure 2:
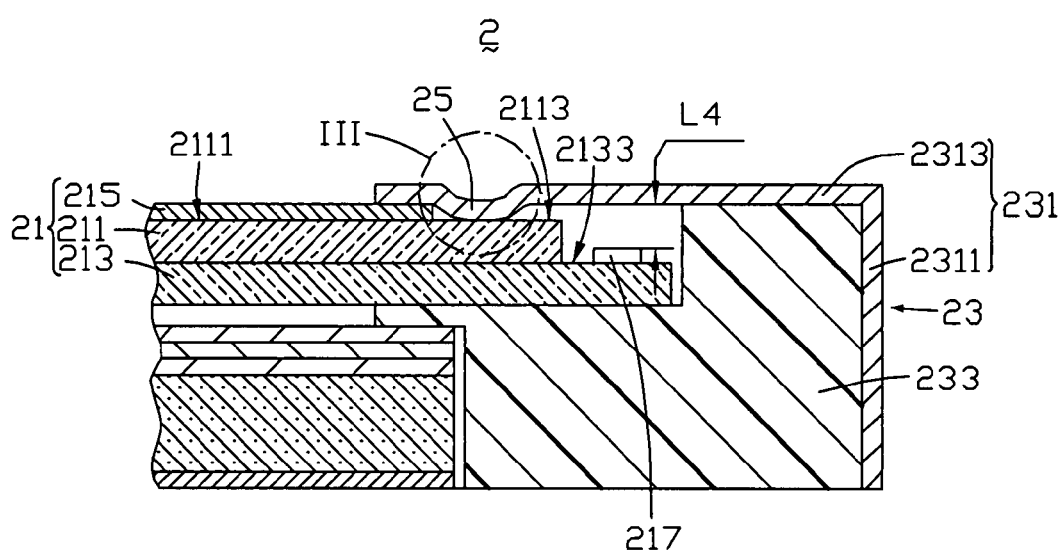
FIG. 2 is a side, cross-sectional view taken along line II-II of FIG. 1.

Also referring to FIG. 2, this is a cross-sectional view taken along line II-II of FIG. 1. The LCD panel 21 includes a first substrate 211, a second substrate 213 parallel to the first substrate 211, and a polarizer 215 attached on a top surface 2111 of the first substrate 211. An uncovered edge area of the top surface 2111 of the first substrate 211 defines a peripheral fixing area 2113. The second substrate 213 defines at least one mounting area 2133 at least one side of a tope surface thereof. FIG. 2 shows one mounting area 2133. A plurality of driver integrated circuits (ICs) 217 are mounted on the mounting area 2133.

The housing assembly 23 includes a rear frame 233 and a bezel 231 cooperatively receiving and securing the LCD panel 21. The rear frame 233 is usually made of plastic and defines a receiving space. The receiving space is for receiving the LCD panel 21 and other components such as a backlight module. The bezel 231 is usually made of metal or another material with high mechanical strength. The bezel 231 includes four top walls 2313 arranged end to end, and four sidewalls 2311 perpendicularly extending from edges of the four top walls 2313, respectively. The four top walls 2313 press on peripheral edge portions of the LCD panel 21 and a top of the rear frame 233, and the four sidewalls 2311 encircle the rear frame 233, so that the LCD panel 21 is tightly fixed in the housing assembly 23.

Each of the four top walls 2313 includes a bead portion 25 near a free edge thereof. The bead portion 25 has a generally U-shaped cross-section. The four bead portions 25 are arranged end to end to form, whereby four arc-shaped corner portions 250 are defined at four corners of the bezel 231 respectively. Each of the bead portions 25 protrudes towards the LCD panel 21 and contacts the fixing area 2113 of the first substrate 211. Because of the bead portions 25, a peripheral vertical gap is formed between the first substrate 211 and the top walls 2313. A height of the gap is substantially the same as a thickness of the polarizer 215. Peripheral edge portions of the polarizer 215 extend into the gap. Thereby, free end portions of the top walls 2313 cover the peripheral edge portions of the polarizer 215 with little pressure.

Figure 3:
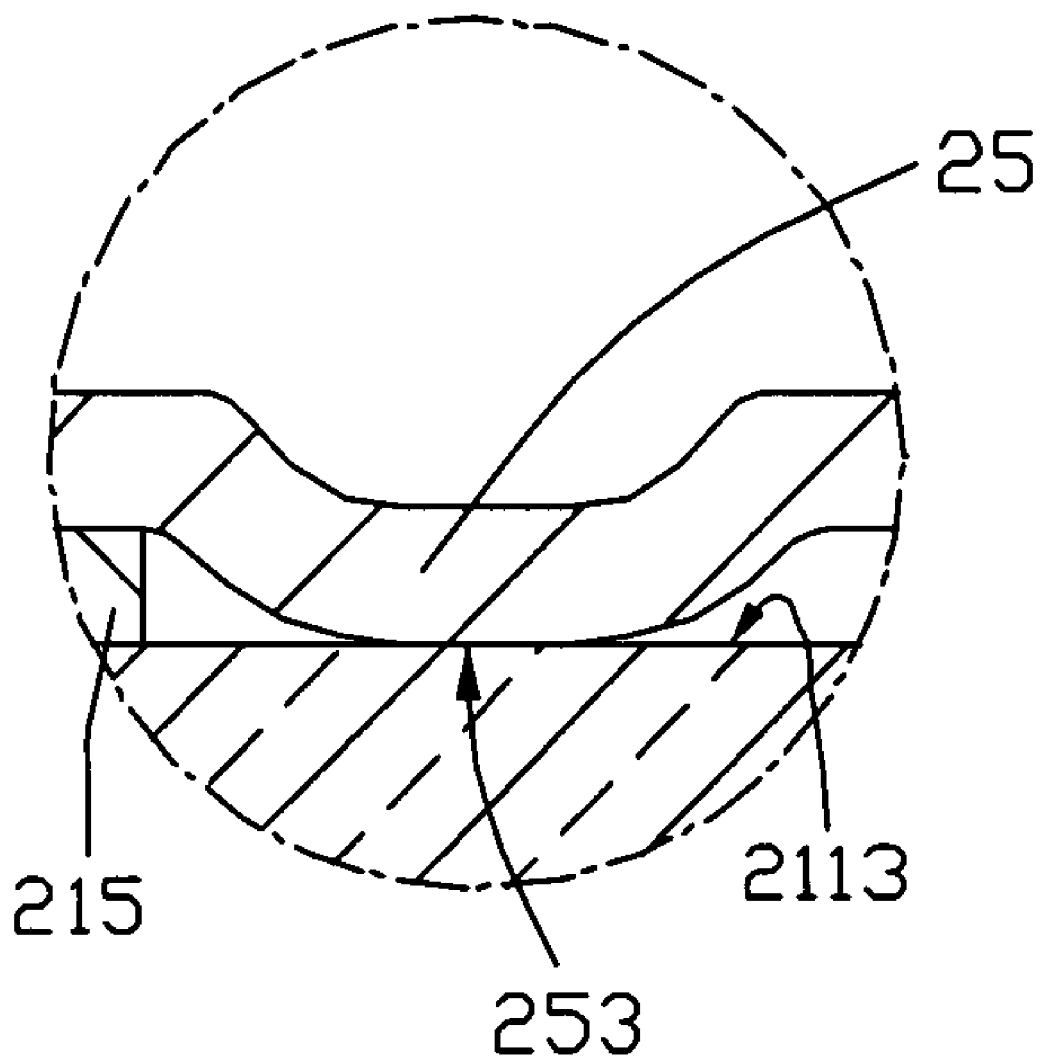
FIG. 3 is an enlarged view of a circled portion III of FIG. 2.

Also referring to FIG. 3, this is an enlarged view of a circled portion III of FIG. 2. The bead portion 25 includes a flat bottom 253 contacting the fixing area 2113 of the first substrate 21. With the flat bottom 253, the bead portion 25 disperses elastic pressure of the corresponding top wall 2313 of the bezel 23 over a large area. Thereby, the LCD panel 21 is tightly fixed in position with little or no risk of being damaged by excessive pressure exerted by the bead portions 25.

With the above-described configuration, the top walls 2313 of the bezel 231 cover the peripheral edge portions of the polarizer 215. Therefore, light leakage and associated light defects such as bright lines are effectively eliminated. In addition, because of the vertical gap between the first substrate 211 and the top walls 2313, the polarizer 215 sustains little pressure from the bezel 231 and is effectively prevented from being distorted or damaged. Therefore the risk of the polarizer 215 producing mottling is substantially reduced or even eliminated.

Furthermore, the bead portion 25 (illustrated in FIGS. 2 and 3) enlarges a gap L4 between the corresponding top wall 2313 of the bezel 231 and the driver ICs 217 on the second substrate 213. The gap L4 provides a buffering space for protecting the driver ICs 217 from unwanted contact by the top wall 2313. That is, the driver ICs 217 are prevented from being crushed by the top wall 2313.

Moreover, the bead portions 25 enhance a mechanical strength of the top walls 2313 and the bezel 231, which contributes to the overall mechanical strength of the housing assembly 23. The corner portions 250 disperse pressure exerted by the top walls 2313 at the four corners of the bezel 231. This facilitates preventing the corners of the LCD panel 21 from being crushed. Still further, the bead portions 25 can be conveniently made by a pressing or stamping process during manufacture of the bezel 231.

Figure 4:
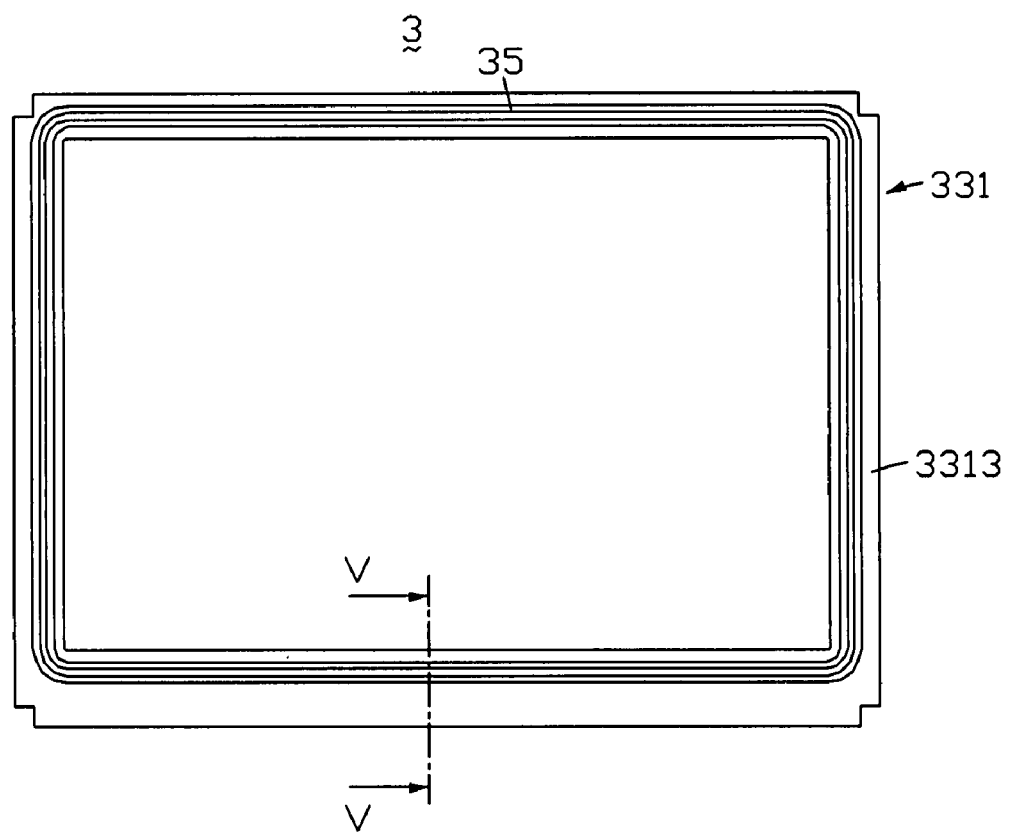
FIG. 4 is a top plan view of an LCD device according to a second embodiment of the present invention.

Referring to FIG. 4, a schematic, top plan view of an LCD device 3 according to a second embodiment of the present invention is shown. The LCD device 3 has a similar structure to that of the LCD device 2. However, each of top walls 3313 of a bezel 331 has two separate U-shaped bead portions 35 that are parallel to each other. The bead portions 35 at the four top walls 3313 are arranged end to end so as to form two substantially rectangular closed loops, with one of the loops being slightly larger than the other.

Figure 5:
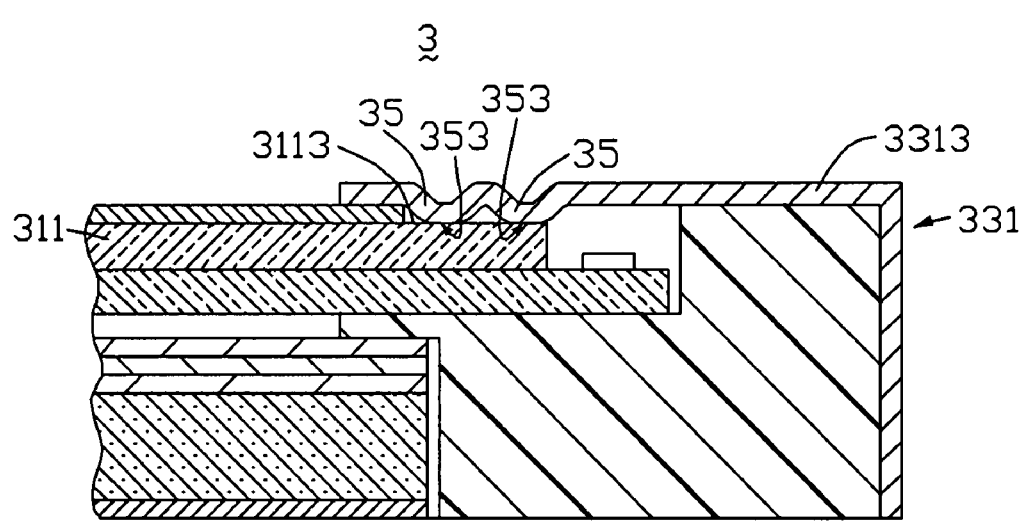
FIG. 5 is a side, cross-sectional view taken along line V-V of FIG. 4.

Also referring to FIG. 5, this is a cross-sectional view taken along line V-V of FIG. 4. Each of the bead portions 35 has a flat bottom 353. The two flat bottoms 353 tightly press on a peripheral fixing area 3113 of the first substrate 311.

With the two bead portions 35, the bezel 331 has a large contact area with the peripheral fixing area 3113 of the first substrate 311. Compared with the above-described first substrate 211 of the LCD device 2, the first substrate 311 sustains less pressure intensity. Thus the LCD device 3 is very effectively prevented from being distorted or damaged by excessive pressure exerted by the top walls 3313 of the bezel 331. Furthermore, the two bead portions 35 enhance the mechanical strength of the bezel 331, which contributes to the overall mechanical strength of the LCD device 3.

Figure 6:
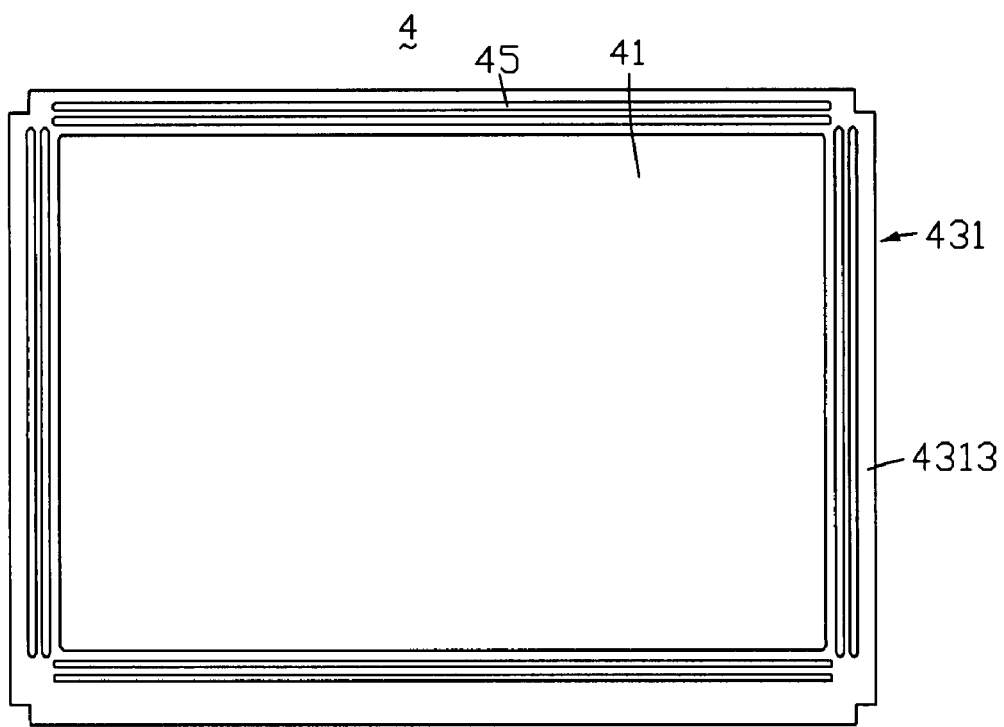
FIG. 6 is a top plan view of an LCD device according to a third embodiment of the present invention.

Referring to FIG. 6, a schematic, top plan view of an LCD device 4 according to a third embodiment of the present invention is shown. The LCD device 4 has a similar structure to that of the LCD device 3. However, two separate, parallel bead portions 45 at each of top walls 4313 are separated from each of the adjacent bead portions 45 at each of the two corresponding adjacent top walls 4313. With this configuration, pressure at four corners of the LCD panel 41 is reduced. Thereby, the risk of crushing of the corners of the LCD panel 41 can be significantly reduced or even eliminated.

Figure 7:
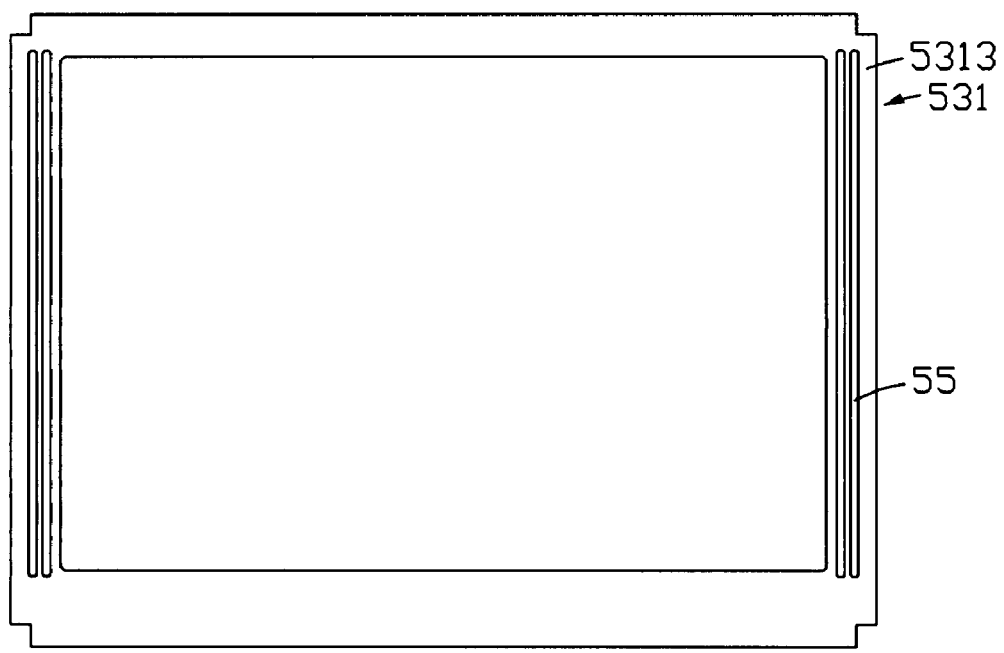
FIG. 7 is a top plan view of an LCD device according to a fourth embodiment of the present invention.
Figure 8:
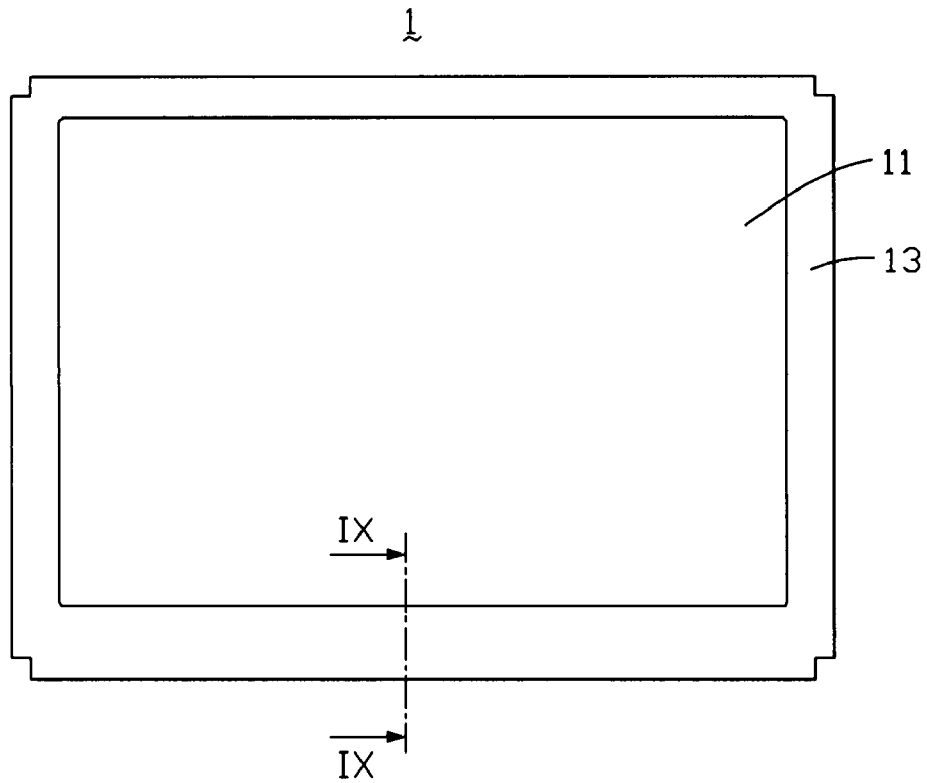
FIG. 8 is a top plan view of a conventional LCD device, the LCD device including an LCD panel and a housing assembly for holding the LCD panel.
Figure 9:
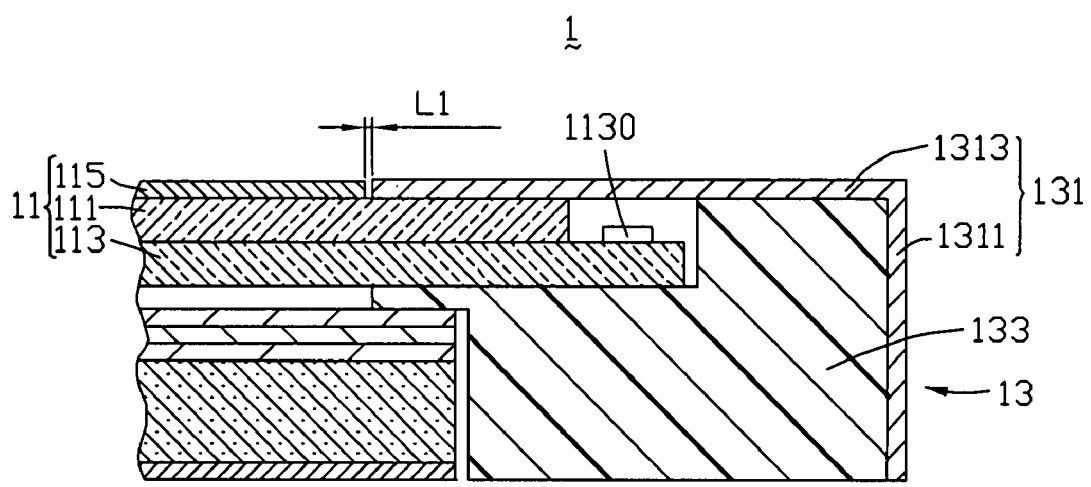
FIG. 9 is a side, cross-sectional view taken along line IX-IX of FIG. 8.

Referring to FIG. 7, a schematic, top plan view of an LCD device 5 according to a fourth embodiment of the present invention is shown. The LCD device 5 has a similar structure to that of the LCD device 4. However, each of only two opposite top walls 5313 of a bezel 531 has two separate, parallel bead portions 55 thereat. In the illustrated embodiment, the bead portions 55 are located at two opposite short top walls 5313. In an alternative embodiment, the bead portions 55 can be located at two opposite long top walls 5313. In further alternative embodiments, one or more bead portion 55 can be arranged at one more of the top walls 5313, as required.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
 a liquid crystal display panel comprising a first substrate, a second substrate parallel to the first substrate, and a polarizer attached on the first substrate; and
 a housing assembly holding the liquid crystal display panel, the housing assembly comprising a bezel;

wherein the bezel comprises at least one bead portion adjacent to an inner free edge thereof, the at least one bead portion elastically contacts a peripheral edge area of the first substrate, and the inner free edge of the bezel covers a peripheral edge portion of the polarizer.

2. The liquid crystal display device as claimed in claim 1, wherein the bezel comprises four side walls arranged end to end, and four top walls perpendicularly extending inward from edges of the four side walls respectively.

3. The liquid crystal display device as claimed in claim 2, wherein the at least one bead portion is arranged at the at least one of the top walls.

4. The liquid crystal display device as claimed in claim 2, wherein the at least one bead portion comprises a flat bottom contacting the peripheral edge area of the first substrate.

5. The liquid crystal display device as claimed in claim 2, wherein a plurality of driver integrated circuits (ICs) are arranged at least one side portion of a top surface of the second substrate.

6. The liquid crystal display device as claimed in claim 5, wherein a vertical gap is maintained between each driver IC and the corresponding top wall of the bezel.

7. The liquid crystal display device as claimed in claim 2, wherein the housing assembly further comprises a rear frame holding the liquid crystal display panel.

8. The liquid crystal display device as claimed in claim 7, wherein the sidewalls of the bezel encircle the rear frame.

9. The liquid crystal display device as claimed in claim 2, wherein each of the top walls of the bezel has at least one bead portion.

10. The liquid crystal display device as claimed in claim 9, wherein the at least one bead portion of each of the top walls of the bezel is one bead portion, and the bead portions of the top walls are arranged end to end, such that four corner portions are defined at four corners of the bezel where the respective bead portions meet each other.

11. A liquid crystal display device, comprising:
a liquid crystal display panel; and
a bezel configured for fixing the liquid crystal display panel therein, wherein the bezel comprises an elongate bead portion protruding toward and resiliently pressing on a peripheral edge area of the liquid crystal display panel.

12. The liquid crystal display device as claimed in claim 11, wherein the liquid crystal display panel comprises a polarizer attached thereon, and an end of the bezel covers a peripheral portion of the polarizer.

13. The liquid crystal display device as claimed in claim 11, further comprising a frame receiving the liquid crystal display panel, the frame and the bezel cooperatively containing and protecting the liquid crystal display panel.

14. A liquid crystal display device, comprising:
a liquid crystal display panel;
a polarizer attached on the liquid crystal display panel; and
a bezel elastically pressing on a peripheral edge area of the liquid crystal display panel and fixing the liquid crystal display panel in position;
wherein the bezel comprises an inner peripheral holding portion adjacent to a part of the bezel that presses on the peripheral edge area of the liquid crystal display panel, a gap is defined between the holding portion and the peripheral edge area of the liquid crystal display panel, and a peripheral portion of the polarizer is located in the gap.

15. The liquid crystal display device as claimed in claim 14, wherein a height of the gap is substantially the same as a thickness of the polarizer.

16. The liquid crystal display device as claimed in claim 14, further comprising a frame containing the liquid crystal display panel.

* * * * *

UNITED STATES PATENT AND TRADEMARK OFFICE
CERTIFICATE OF CORRECTION

PATENT NO. : 7,868,965 B2  
APPLICATION NO. : 11/985258  
DATED : January 11, 2011  
INVENTOR(S) : He-Xin Sun Page 1 of 1

It is certified that error appears in the above-identified patent and that said Letters Patent is hereby corrected as shown below:

Title page, item (73) Assignees: should read as follows:
Innocom Technology (Shenzhen) Co., Ltd., Shenzhen, Guangdong Province (CN); Chimei Innolux Corporation, Miao-Li County (TW).

Signed and Sealed this  
Seventh Day of June, 2011

David J. Kappos  
*Director of the United States Patent and Trademark Office*